United States Patent [19]
Tamura et al.

[11] Patent Number: 5,729,127
[45] Date of Patent: Mar. 17, 1998

[54] MAGNETISM DETECTING APPARATUS HAVING GEAR TEETH DIMENSIONS FOR MINIMAL PULSE SIGNAL DISTORTION

[75] Inventors: Tatsuo Tamura, Kuwana; Kenji Yagi, Nagoya; Yasuaki Makino, Okazaki; Ichiro Izawa, Anjo, all of Japan

[73] Assignee: Nippondenso Co., Ltd., Kariya, Japan

[21] Appl. No.: 527,200

[22] Filed: Sep. 12, 1995

[30] Foreign Application Priority Data

Sep. 13, 1994 [JP] Japan ................... 6-218929

[51] Int. Cl.⁶ .................... G01P 3/488; G01R 33/06; G01B 7/30
[52] U.S. Cl. ................ 324/174; 324/207.21; 324/207.22; 324/207.25
[58] Field of Search .................. 324/166, 173, 324/174, 207.2, 207.21, 207.22, 207.23, 207.24, 207.25, 207.26, 252; 338/32 H, 32 R

[56] References Cited

U.S. PATENT DOCUMENTS

| 3,366,874 | 1/1968 | Kuhne | 324/174 |
| 4,853,632 | 8/1989 | Nagano et al. | 324/207.21 |
| 5,304,926 | 4/1994 | Wu | 324/207.25 |
| 5,359,287 | 10/1994 | Watanabe et al. | 324/207.21 |

FOREIGN PATENT DOCUMENTS

| 0539602 | 5/1993 | European Pat. Off. | |
| 55-31964 | 3/1980 | Japan | |
| 205516 | 8/1988 | Japan | 324/207.21 |
| 79614 | 3/1989 | Japan | 324/207.21 |

Primary Examiner—Sandra L. O'Shea
Assistant Examiner—Jay M. Patidar
Attorney, Agent, or Firm—Cushman Darby & Cushman IP Group of Pillsbury Madison & Sutro LLP

[57] ABSTRACT

In a magnetism detecting apparatus, a magnetoresistance element is positioned adjacent to a gear with teeth to be responsive to magnetic field applied thereto. The gear is shaped such that each of the teeth satisfies $SA/(SA+SB) < 0.125$, where SA denotes a cross-sectional area of a tip portion of each of the teeth, which tip portion is measured through 10% of a height of each of the teeth taken from a tip of each of the teeth, and SB denotes a cross-sectional area of a notch portion of each notch between the teeth, which notch portion has a height corresponding to the height of the teeth. As a result of this configuration, distortion contained in an output signal based upon high and low threshhold values from the magnetoresistance element can be eliminated. In addition, variations in intervals of a pulse signal obtained by performing a waveform shaping operation can be reduced, even when a distance between the gear teeth and the magnetoresistance element is varied.

9 Claims, 15 Drawing Sheets

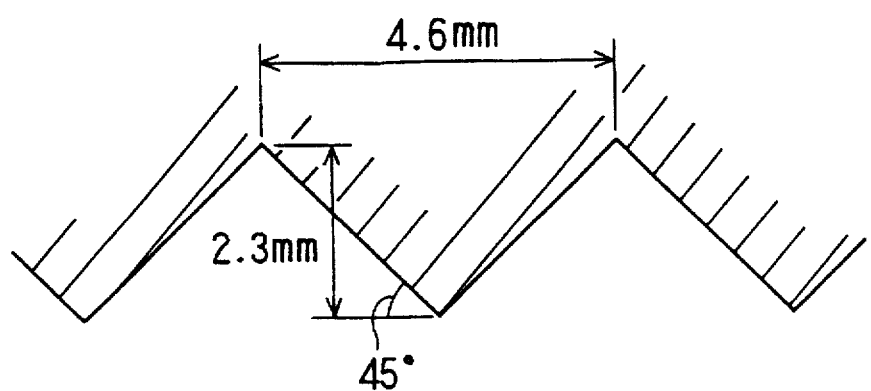
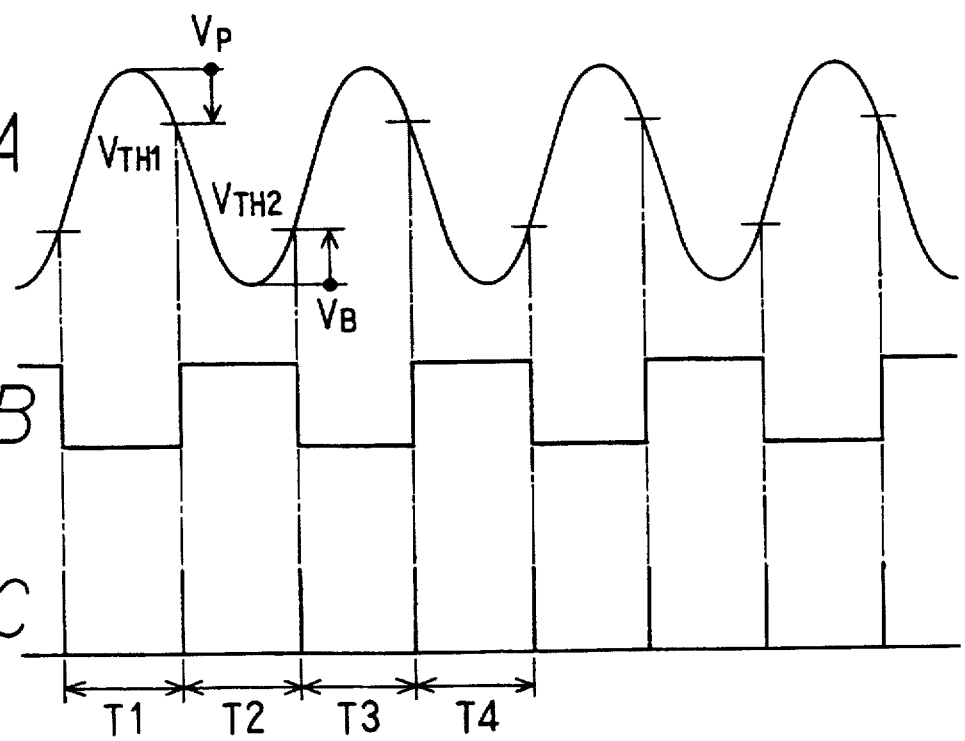

FIG.6A1
FIG.6A2
FIG.6A3
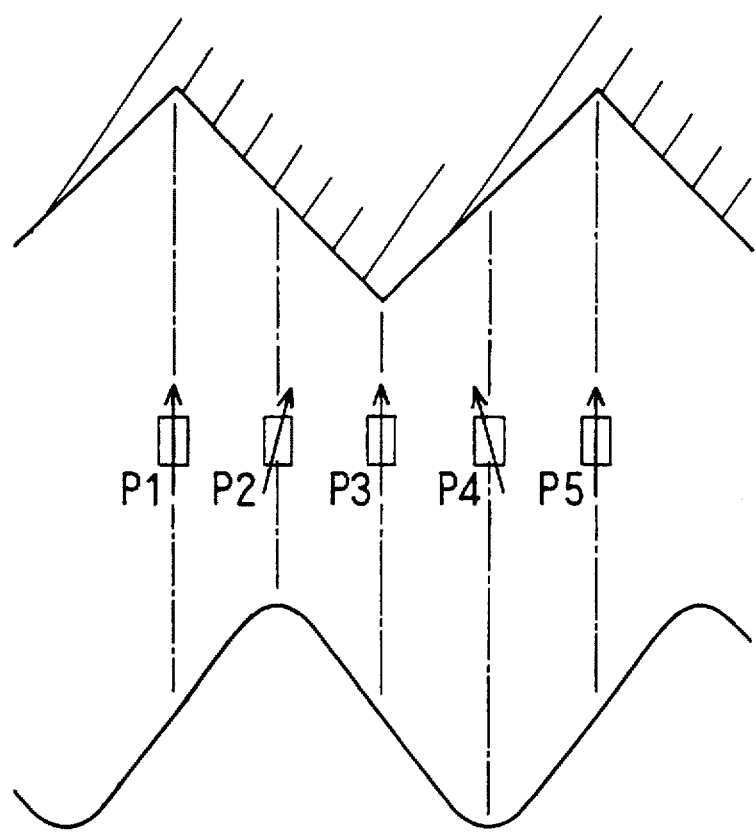
FIG.6B1
FIG.6B2
FIG.6B3
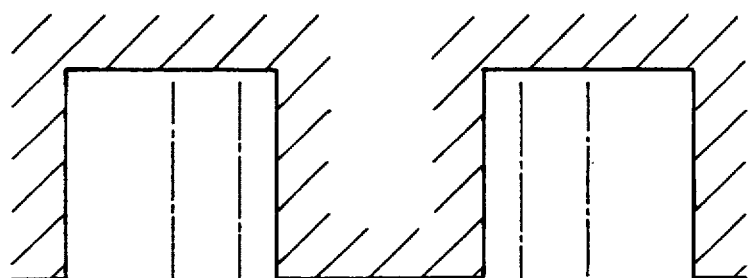
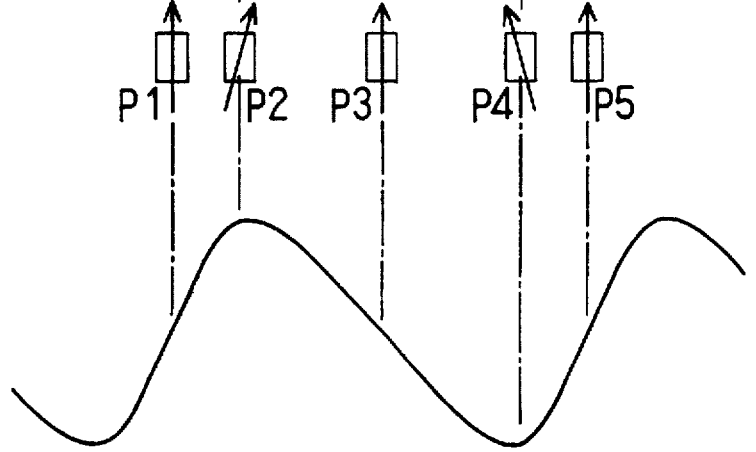

FIG.12 PRIOR ART
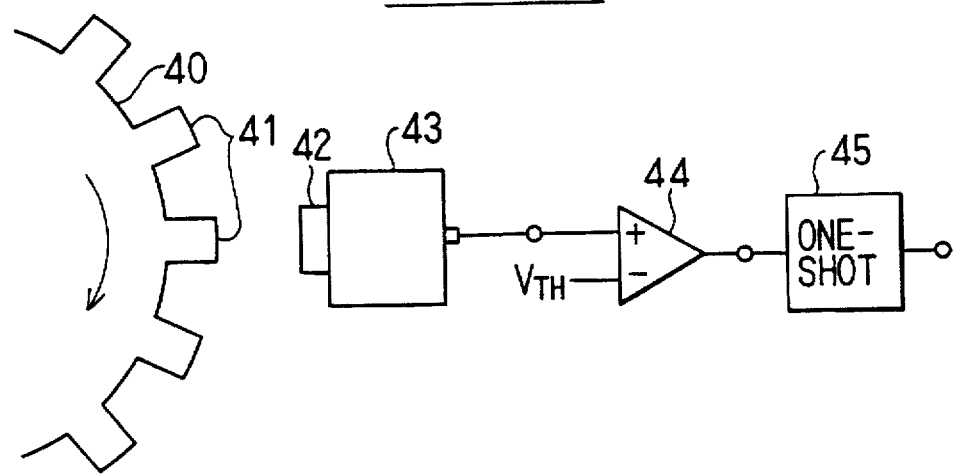
FIG.13A PRIOR ART
FIG.13B PRIOR ART
FIG.13C PRIOR ART
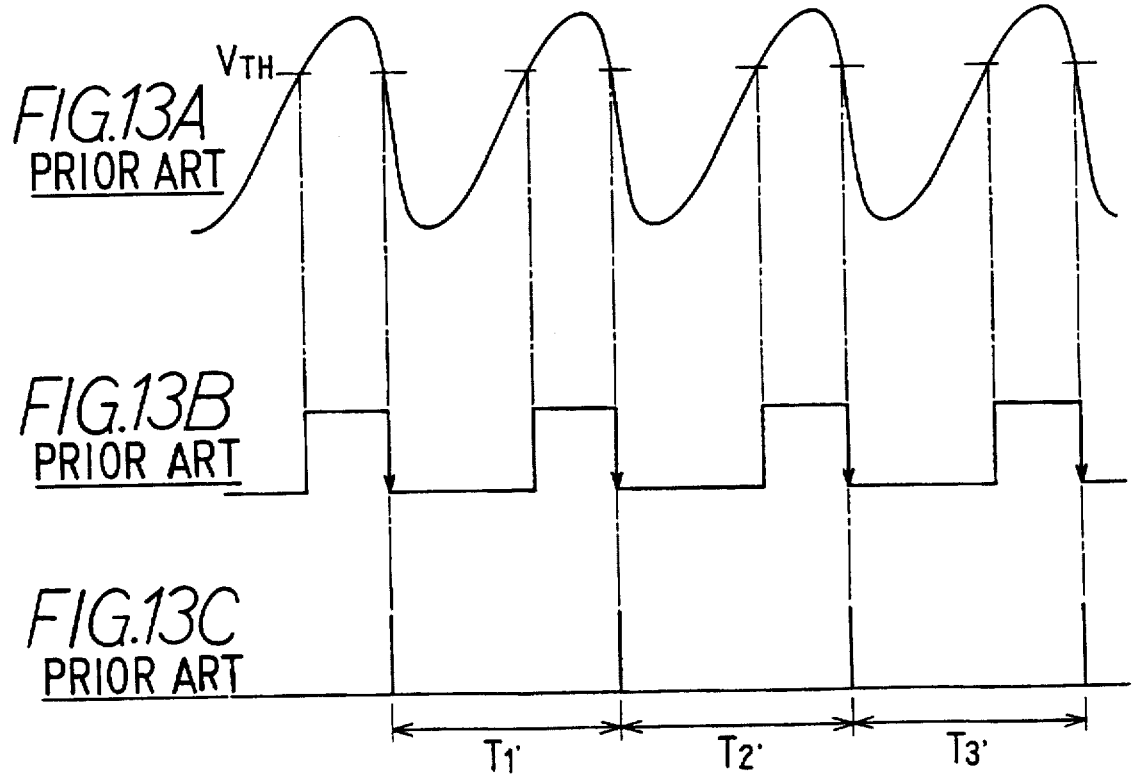

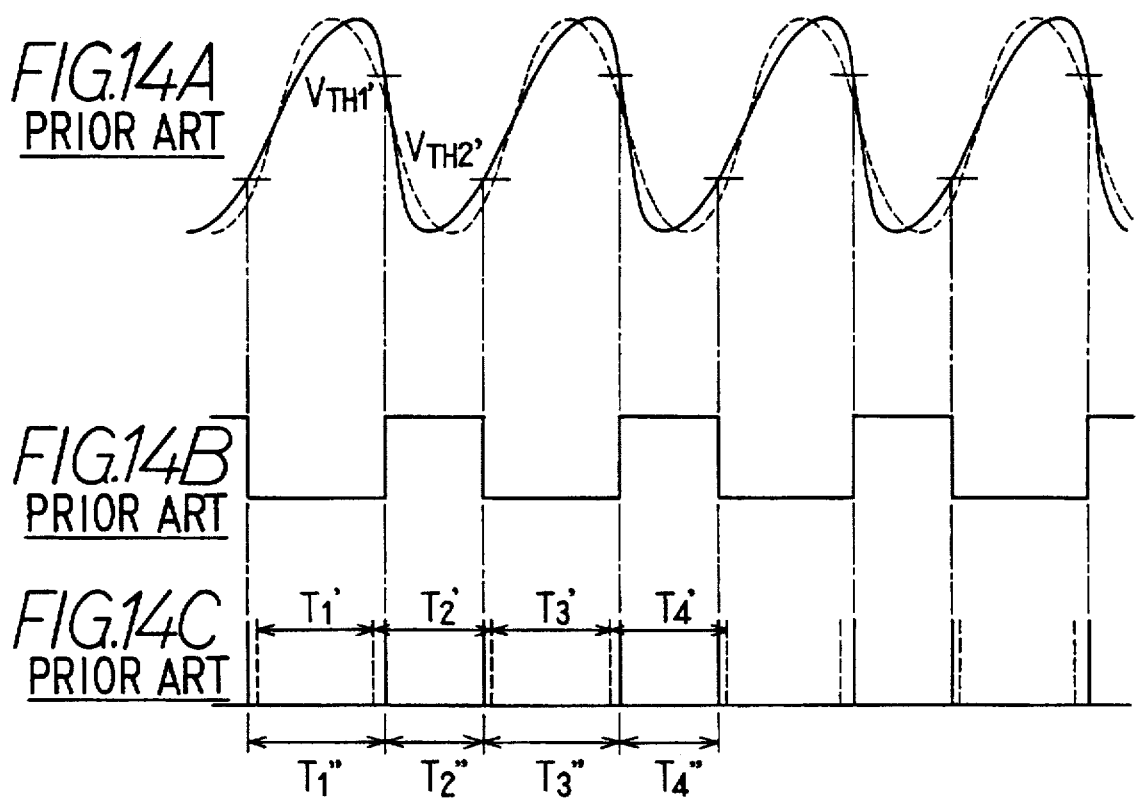

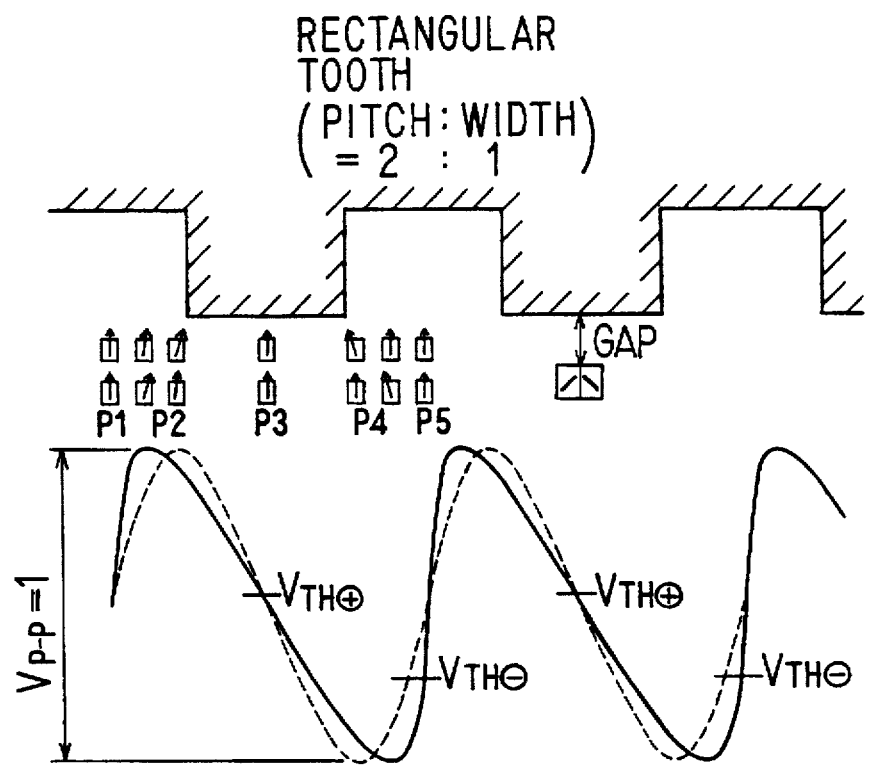
FIG.15A PRIOR ART
FIG.15B PRIOR ART
FIG.15C PRIOR ART
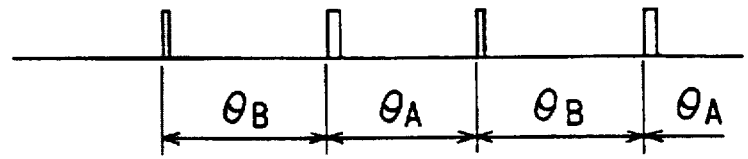
FIG.15D PRIOR ART
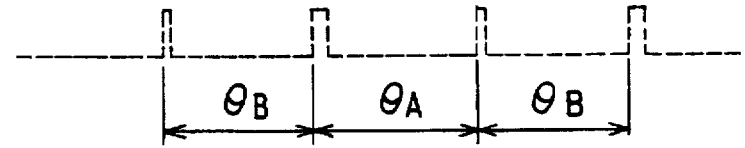
FIG.15E PRIOR ART

MAGNETISM DETECTING APPARATUS HAVING GEAR TEETH DIMENSIONS FOR MINIMAL PULSE SIGNAL DISTORTION

CROSS REFERENCE TO RELATED APPLICATION

This application is based on and claims priority of Japanese Patent Application No. 6-218929 filed on Sep. 13, 1994, the content of which is incorporated herein by reference.

BACKGROUND OF THE INVENTION

1. Field of the Invention

This invention relates to a magnetism detecting apparatus for detecting motion (movement) of an object under detection by using a change in resistance values of a magnetoresistance element (MRE), and for processing a detection signal to obtain a pulse signal indicative of the detected motion of the object to be detected.

2. Description of Related Art

Magnetism detecting apparatuses such as disclosed in U.S. Pat. No. 5,359,287 are known in the art. In FIG. 12, there is shown an arrangement of this sort of magnetic or magnetism detecting apparatus. In this figure, a bias magnet 43 produces a bias magnetic field toward a gear 40 functioning as an object under detection, and a sensor unit 42 equipped with an MRE (magnetoresistance element) outputs a signal (i.e., signal indicated in FIG. 13A) in response to a resistance variation of the MRE caused by the rotation of this gear 40 or magnetism. In general, a large number of rectangular teeth 41 is formed in the gear 40, and a ratio of a pitch between the successive teeth to a tooth width is selected to be 1:1. Then, a signal waveform from the sensor unit 42 is converted into a binary signal (signal shown in FIG. 13B) based on a predetermined threshold value VTH in a comparator 44. Thereafter, a pulse signal shown in FIG. 13C is produced by a monostable circuit (monostable multivibrator) 45, which corresponds to a falling edge of the binary signal.

In the case that the detection signal from the MRE is digitized to produce the binary signal and then only one signal edge (falling edge) of this binary signal is used as the rotation detecting signal, the pulse intervals T1', T2' and T3' become equal to each other under the constant rotation as shown in FIGS. 13A to 23C. As a result, such a pulse signal having a constant interval can be obtained.

Very recently, on the other hand, when the magnetism detecting apparatus is used in, for example, a high-pressure fuel injection pump, a strong demand is made to produce the rotation detecting signals in multi-pulse signal form. Thus, such a signal processing method has been proposed that the detection signal from the MRE is digitized based on the two threshold values VTH1' and VTH2' having the high and low levels, and the pulse signals are produced at both edges of the binary signals, as shown in FIGS. 14A to 14C. In this binary processing method, the threshold values VTH1' and VTH2' which are shifted from the peak value and the bottom value of the MRE detection signal at a preselected ratio are set in order that the signal edge having the constant interval can be obtained under the constant rotation. In this case, as shown in FIGS. 14A to 14C, a total number of the resultant pulse signals becomes two times larger than the of the pulse signals illustrated in FIGS. 13A to 13C.

However, when the signal process operation is carried out at both edges as represented in FIGS. 14A to 14C, the following problems occur. That is, the pulse intervals T1" to T4" repeatedly become "narrow" and "wide" alternately, so that the pulse signal with the constant interval cannot be obtained even under constant rotation. This may cause that the MRE detection signal (indicated by solid line in FIG. 14A) is distorted with respect to the sine wave (indicated by broken line in FIG. 14A). Inventors of the present invention could analyze that this distortion would be adversely influenced by correlation between the gear tooth shape and the magnetic vector characteristic, and mainly the secondary higher harmonic components. Also, since the intervals between the gear teeth and the sensor unit are fluctuated, the waveforms of the MRE detection signals would be distorted, so that the pulse intervals are not constant while the pulse intervals T1' to T4' corresponding to sine wave become constant.

SUMMARY OF THE INVENTION

The present invention has been made to solve the above-described problems, and has an object to provide a magnetism detecting apparatus capable of eliminating distortion contained in a signal waveform of a magnetoresistance effective element (MRE), which is caused when an object under detection having teeth of a gear passes through, even when intervals between gear teeth and a sensor unit are fluctuated, and further capable of reducing fluctuations contained in intervals of a pulse signal obtained by way of a wave shaping operation even when a total number of rotation detecting signals are increased.

According to the present invention, a magnetoresistance element (MRE) causes a resistance value thereof to be changed in response to a state variation of a biasing magnetic field. A waveform shaping means digitizes an output waveform of the magnetoresistance element based on two sets of high and low threshold levels, and produces a pulse signal in response to a rising edge of the digitized output signal and a falling edge thereof. At this time, even when an interval between this magnetoresistance element and the teeth of the object under detection is fluctuated, the output waveforms having the symmetrical shapes can be maintained. As a result, fluctuation in the signal intervals of the pulse signal obtained by the waveform shaping operation can be reduced, and thus the pulse signal having the intervals proportional to the movement speed of the object under detection can be obtained in higher precision.

Preferably, the shape of the tooth formed in the object under detection is made of an isosceles triangle, so that the waveform having low distortion can be readily formed even when the intervals between the magnetoresistance element and the teeth of the object under detection change.

Preferably, the secondary higher harmonic components (second harmonics) can be further reduced, and higher rigidity of the tooth tip portion can be maintained, so that the sintering manufacturing process can be easily performed.

Preferably, since the teeth of the object under detection is manufactured in such a manner that the averaged tooth width is nearly equal to ⅙ of the pitch between the adjacent teeth, the magnetic vector characteristic shifts caused when the teeth pass through the sensor unit do not easily occur. Also the distorted waveforms constructed of higher harmonic components are not readily produced. As a consequence, the intervals of the pulse signal obtained by way of the waveform shaping operation can be reduced. There are other advantages in manufacturing of the teeth with higher rigidity.

BRIEF DESCRIPTION OF THE DRAWINGS

In the accompanying drawings:

FIG. 2 is a sectional view for showing a tooth shape of a gear;

FIGS. 3A to 3C are timing charts for showing a signal process, in which FIG. 3A shows an MRE detection output, FIG. 3B shows an output from a comparator, and FIG. 3C shows an output from a monostable circuit;

FIGS. 6A1 to 6B3 are timing charts for explaining a change in magnetic vectors, caused by rotating a gear, in which FIGS. 6A1 to 6A3 are timing charts for showing the magnetic vector variations caused by the gear according to this embodiment, and FIGS. 6B1 to 6B3 are timing charts for showing the magnetic vector variations caused by the prior art gear;

FIGS. 7A and 7B are diagrams for showing a relationship between a gear tooth shape and a secondary higher harmonic component, in which FIG. 7A is a sectional view of the gear teeth, and FIG. 7B is a diagram for showing the relationship;

FIGS. 8A and 8B are diagrams for showing a relationship between the gear tooth shape and a sensor output ratio, in which FIG. 8A is a sectional view of the gear teeth, and FIG. 8B is a diagram for showing the relationship;

FIG. 12 is a schematic structural diagram for showing a conventional magnetic detecting apparatus;

FIGS. 13A to 13C are timing charts for showing the conventional signal processing operation, in which FIG. 13A shows an MRE detection output, FIG. 13B shows an output from a comparator, and FIG. 13C shows an output from a monostable circuit;

FIGS. 14A to 14C are timing charts for showing conventional signal processing operation, in which FIG. 14A shows the MRE detection output, FIG. 14B shows the output from the comparator, and FIG. 14C shows the output from the monostable circuit;

FIGS. 15A to 15E are timing charts for explaining changes in pulse intervals when a gap is changed in the prior art;

DETAILED DESCRIPTION OF THE PREFERRED EMBODIMENTS

Referring now to the accompanying drawings, a magnetic rotation detecting apparatus in which the present invention is embodied will be described. The magnetic rotation detecting apparatus, according to this preferred embodiment of the present invention, produces a signal corresponding to, for instance, rotation of a crank angle of an internal combustion engine. The magnetic rotation detecting apparatus is arranged by a sensor unit for sensing a rotation of an object to be detected (gear) caused by driving the internal combustion engine by a magnetoresistance element (MRE), and a signal processing unit for shaping a waveform of a sensor output from the sensor unit.

Figure 1:
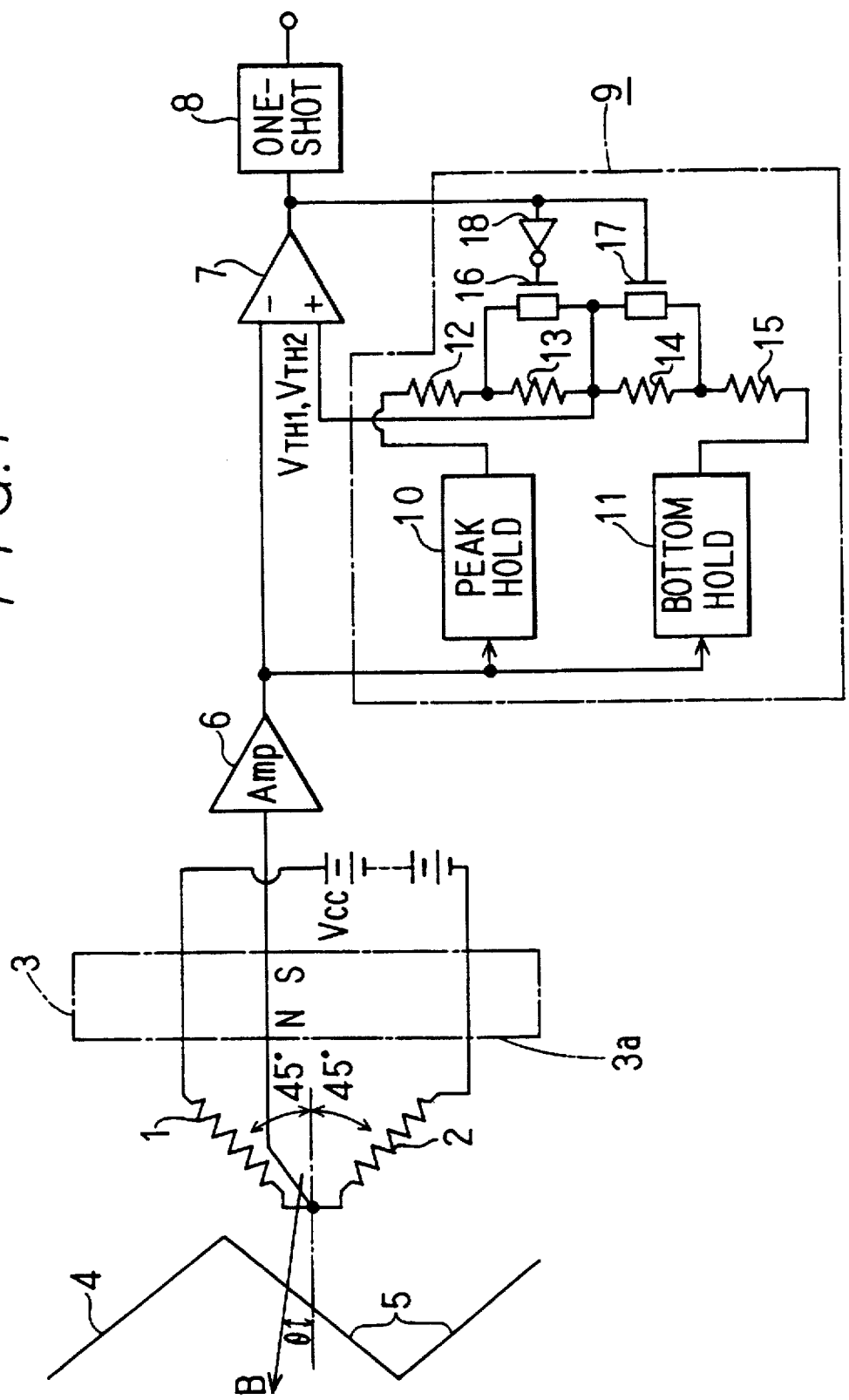
FIG. 1 is a schematic structural diagram for showing a magnetic rotation detecting apparatus according to an embodiment of the present invention.

FIG. 1 schematically shows an arrangement of the magnetic rotation detecting apparatus. In FIG. 1, one surface of a bias magnet 3 constructed of a permanent magnet is magnetized as an N pole, and the other surface thereof is magnetized as an S pole. The bias magnet 3 produces the bias magnetic field along a direction substantially normal to the magnetized surface 3$a$. MREs (magnetoresistance elements) 1 and 2 are vapor-deposited on a board or substrate (not shown). One pair of these MREs 1 and 2 are arranged within such a plane involving the bias magnetic field direction produced by the bias magnet 3 and a direction along which teeth is continued in such a manner that these MREs are located at angles of +45 degrees and −45 degrees with respect to this magnetic field direction. A constant voltage Vcc is applied between both ends of the MREs 1 and 2. A voltage appearing at a midpoint of these MREs 1 and 2 is derived as a sensor output (referred to as an "MRE output" hereinafter). It should be noted that although the bias magnet 3 is made hollow and the board passes through this bias magnet 3 in this case, the bias magnet may be made not hollow but may be arranged on either a front surface of the board, or a rear surface thereof.

On the other hand, a gear 4 corresponding to the object to be detected is made from a magnetic material. A large number of teeth 5 whose cross-sectional shape is a line symmetrical shape, as viewed along an axial direction of the gear 4, is continuously formed on the gear 4. Teeth notch portions or notches are formed among a plurality of teeth 5. Then, the above-described MREs 1 and 2 are arranged in a preselected interval in such a manner that these MREs are located opposite to the teeth 5. As illustrated in FIG. 2, the teeth 5 are formed as an isosceles triangular having two sides extending at equal angles. In this embodiment, a pitch between the adjacent teeth is selected to be 4.6 mm, a height of a tooth is selected to be 2.3 mm, and angles defined by the respective sides with respect to the gear rotation direction become 45 degrees, and a vertex of angle is selected to be 90 degrees. As a consequence, the magnetic force line derived from the N pole of this bias magnet 3 is penetrated through the MREs 1 and 2 and the gear 4 of the magnetic material, and is inverted to be again returned to the S pole of the bias magnet 3.

In FIG. 1, the detection signal outputted from the MREs 1 and 2 (namely, MRE output signal) is supplied via an amplifier 6 to an invert input terminal of a comparator 7, and then is digitized based on predetermined threshold values VTH1 and VTH2 set by a threshold value setting circuit 9 to produce binary signals. In the threshold value setting circuit 9, both of a peak value (maximum value) and a bottom value (minimum value) of the MRE output signal are used as a first threshold value VTH1 and a second threshold value VTH2 by shifting these peak and bottom values by a preselected ratio in accordance with a voltage difference between both peak/bottom values. At this time, a signal edge proportional to the movement velocity of the gear 4 is obtained by digitizing the MRE output signal in the comparator 7. An output from the comparator 7 is inputted to a one-shot circuit (monostable multivibrator) 8, so that short pulse signals are produced which correspond to the rising edge of the binary signal and the falling edge thereof outputted from the comparator 7.

Now, a detailed description will be made of the above-described threshold value setting circuit 9. The MRE output signal which has passed through the amplifier 6 is entered into a peak hold circuit 10 and a bottom hold circuit 11 within the threshold value setting circuit 9. Resistors 12 to 15 are connected in series with each other, and output voltages from a peak hold circuit 10 and the bottom hold circuit 11 are applied to both ends of the series circuit of the resistors 12 to 15. The resistor 12 and the resistor 15 have the same resistance value, and the resistor 13 and the resistor 14 have the same resistance value. Digital switches 16 and 17 are connected between the both ends of the resistor 13, and also between the both ends of the resistor 14, respectively. These digital switches 16 and 17 are conducted, or interrupted alternately in response to the output signal levels of the comparator 7. Then, a midpoint between the resistor 13 and the resistor 14 is connected to a non-invert input terminal of the comparator 7. The output terminal of the comparator 7 is connected via an inverter 18 to the digital switch 16, and is directly connected to the digital switch 17. As a result, either the digital switch 16 or the digital switch 17 is turned ON in response to the output from the comparator 7.

According to this threshold value setting circuit 9, the first threshold value VTH1 is obtained which is lower than the peak value VP by a constant ratio of a variation value "A(VP−VB)", and also the second threshold value VTH2 is obtained which is higher than the bottom value VB by this constant ratio of the variation value "A(VP−VB)", with the coefficient "A" being defined as 0<A<1. Namely, VTH1= VP−A(VP−VB) and VTH2=VB+A(VP−VB). This variation value "A(VP−VB)" is determined based on a difference between the peak value VP and the bottom value VB of the MRE output signal.

Then, in the magnetic rotation detecting apparatus in the above-described circuit arrangement, when the gear 4 is rotated, the magnetic vector B is drawn to the teeth 5 of the gear 4 thereby to be vibrated in connection with this rotation. Thus, the MREs 1 and 2 produce resistance changes in response to a change in the directions of the magnetic vector B, so that a pair of MREs 1 and 2 exert the magnetic forces in reverse phases with each other. At this time, the MRE output signal represents a substantially sinusoidal wave as indicated in FIG. 3A. Further, since the MREs 1 and 2 are arranged at angles of +45 degrees and −45 degrees with respect to the bias magnetic field direction, this MRE output signal has more essentially sinusoidal wave.

Thereafter, this MRE output signal is compared with the two threshold values VTH1 and VTH2 set by the threshold value setting circuit 9, so that a binary signal as shown in FIG. 3B is outputted from the comparator 7. Furthermore, in the monostable (one shot) circuit 8, a pulse signal is produced and outputted which corresponds to the rising edge of the binary signal and the falling edge thereof derived from the comparator 7, as shown in FIG. 3C. The crank angle or rotation angle of the internal combustion engine may be determined based on the interval of this pulse signal, so that engine revolution information can be obtained. In accordance with the magnetic rotation detecting apparatus of this embodiment, distortion contained in the MRE output signal, as shown in FIG. 3A, can be obviated, and while the gear 4 is rotated at a constant rotation speed, the signal intervals of the pulse signal can be maintained at constant values, as indicated in FIG. 3C, (T1=T2=T3=T4).

Now, the detection principle of the magnetic detecting apparatus will be explained.

Figure 4:
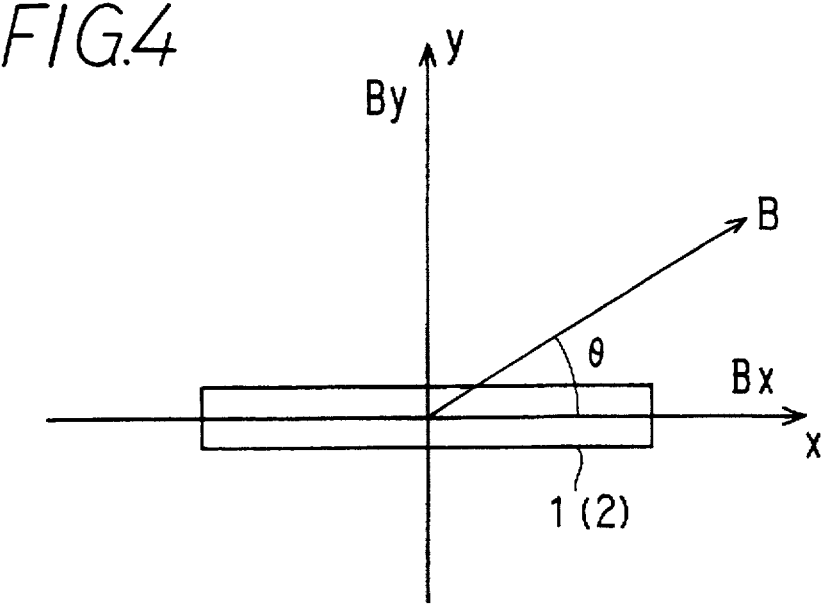
FIG. 4 is a plan view for showing a direction of MRE.
Figure 5:
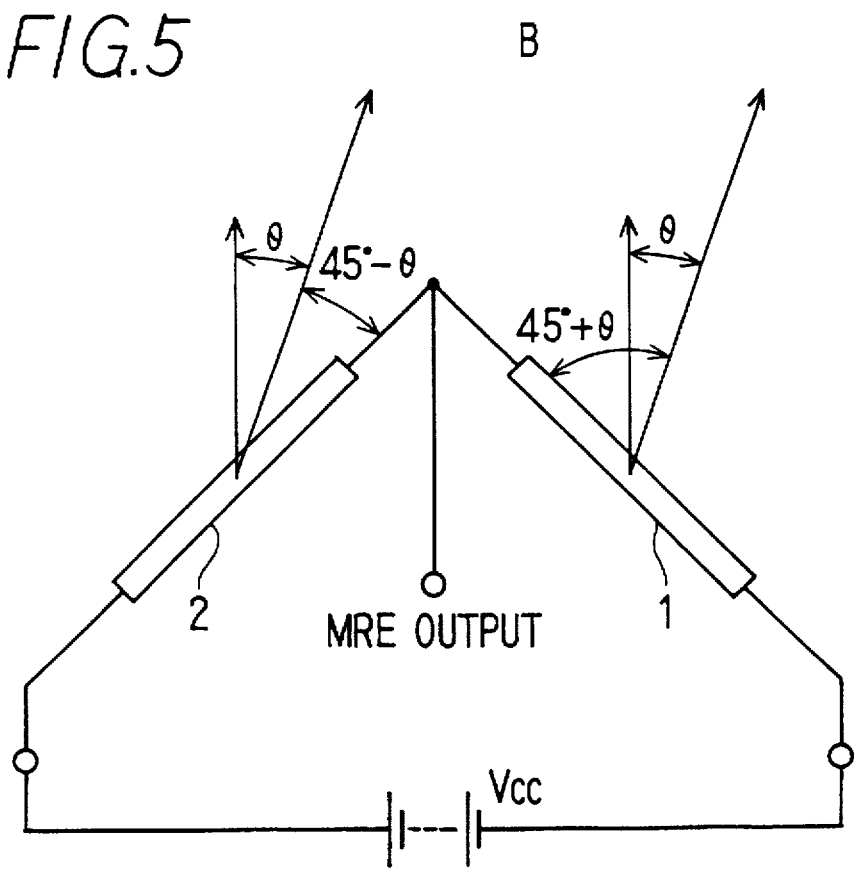
FIG. 5 is a plan view for showing a direction of a magnetic vector applied to MRE.

The MRE output signal is changed in proportion to a vibration angle "θ" of the magnetic vector B. In other words, as illustrated in FIG. 4, in the case that the magnetic vector B located in parallel to the direction of the current flowing through the MREs 1 and 2 is set to Bx and the magnetic vector B located perpendicular to the current direction is set to By, assuming that the resistance values in the saturation region are selected to be Rx and Ry, the resistance values R1 and R2 of the MREs 1 and 2 shown in FIG. 5 are defined from the Viogt-Thomson formula as follows:

$$R1 = Rx \cdot \cos^2(45°+\theta) + Ry \cdot \sin^2(45°+\theta)$$

$$R2 = Rx \cdot \cos^2(45°-\theta) + Ry \cdot \sin^2(45°-\theta)$$

Also, the MRE output signal is given as follows:

$$\text{MRE output signal (AC component)} = (Rx-Ry) \cdot Vcc \cdot \theta/(Rx+Ry) = K \cdot \theta$$

As described above, when the gear 4 is rotated, the MRE output signal depends upon the characteristic of the deflection (vibration) angle θ. To obtain a desired MRE waveform, it is very important to manage this deflection angle θ of the magnetic vector B.

FIG. 6A1 to FIG. 6B3 show relationships between deflections of the magnetic vector B with respect to the tooth shapes of the gear 4 and the signal waveforms corresponding thereto. FIG. 6A1 shows a tooth shape (triangular teeth) according to this embodiment, and FIG. 6B1 shows the conventional tooth shape (rectangular teeth). In these figures, positions P1, P3 and P5 show such positions that the deflection angle θ of the magnetic vector becomes "0", whereas positions P2 and P4 indicate such positions that the deflection angle θ becomes maximum in any of the plus and minus directions.

In the case shown in FIG. 6A1 to FIG. 6A3, the positions P1 to P5 are located in substantially equal intervals. As a consequence, since the peak position of the MRE output signal corresponding to the position P2, and the bottom position of the MRE output signal corresponding to the position P4 are not deflected to any of the positions P1, P3 and P5, the sine wave of FIG. 6A3 containing less distortion can be obtained. To the contrary, in the conventional case shown in FIG. 6B1 to FIG. 6B3, the position P2 of peak output level is deflected to the P1-position side, and the position P4 of the bottom output level is deflected to the P5-position side. As a consequence, both of the peak position of the MRE output signal and the bottom position thereof are deflected, so that the output signal containing distortion is produced. In other words, the sinusoidal wave can be obtained as the MRE output signal with respect to the magnetic vector characteristic shown in FIG. 6A1 to FIG. 6A3, whereas the distorted signal wave is obtained in the conventional magnetic vector characteristic shown in FIG. 6B1 to FIG. 6B3.

As the causes of the distortion contained in the MRE output signal, the adverse influences by the secondary higher harmonic components are conceived. That is, the MRE output signal corresponds to a synthesized wave produced from a basic wave and a higher harmonic wave, so that the greater the higher harmonic wave becomes, the higher the distortion degree becomes. However, as an experimental result made by the present invention, since the tooth shape of the gear is made triangular, it could be confirmed that the secondary higher harmonic component can be considerably reduced.

Figure 7A:
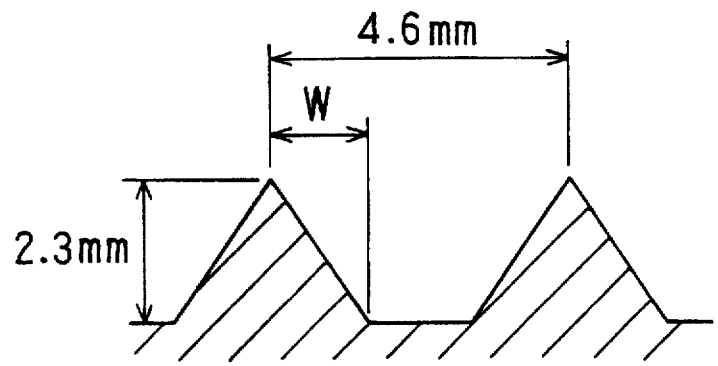
Figure 7B:
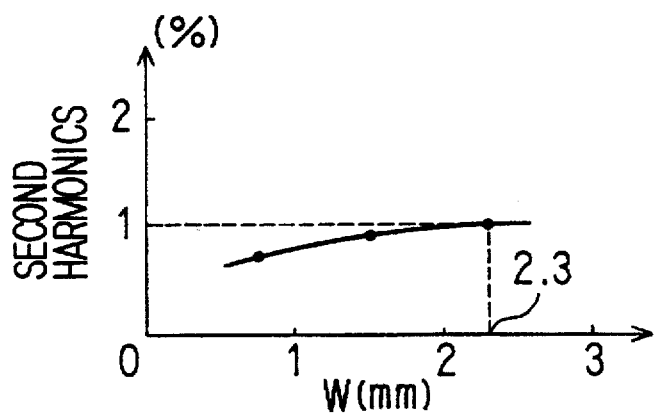
Figure 8A:
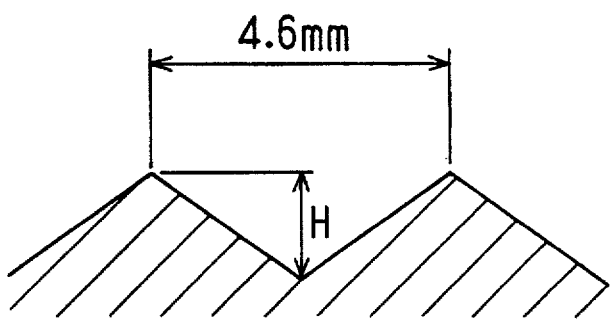
Figure 8B:
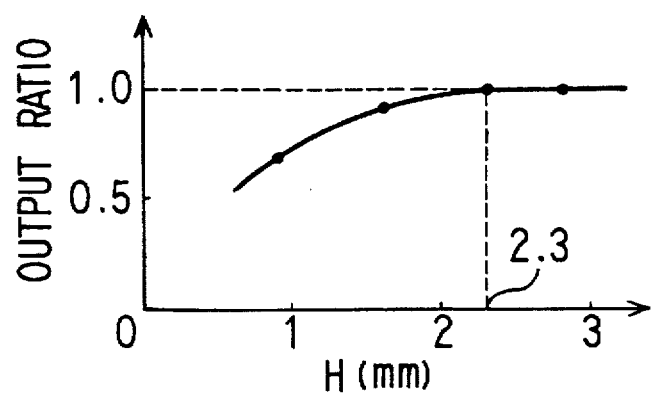

On the other hand, FIGS. 7A and 7B show how a relationship between the tooth shape of the gear and the secondary higher harmonic (second harmonics) component, and FIGS. 8A and 8B show a relationship between the tooth shape of the gear and the sensor output ratio. According to FIGS. 7A and 7B, it can be seen that the smaller the tooth width W becomes, the lower the rate (%) of higher harmonic component becomes. In FIGS. 7A and 7B, if W=2.3 mm (namely, this embodiment), then the secondary higher harmonic component becomes substantially 1%, whereas if W<2.3 mm, then the secondary higher harmonic component becomes less than 1%. In the case of FIG. 8A and FIG. 8B, when the teeth height H is varied while maintaining the interval between the MREs and the gear teeth at constant, the smaller the teeth height H becomes, the lower the sensor output ratio becomes. That is to say, in accordance with the tooth gear of this embodiment, the secondary higher harmonic component can be reduced and the MRE output signal can be maintained at a higher level. It should be understood that the above-described dimension of the triangular tooth in this embodiment may be arbitrarily changed, taking account of various factors. There are merits, i.e., easy sintering process when the triangular tooth shape is made of a right isosceles triangular.

Figure 9A:
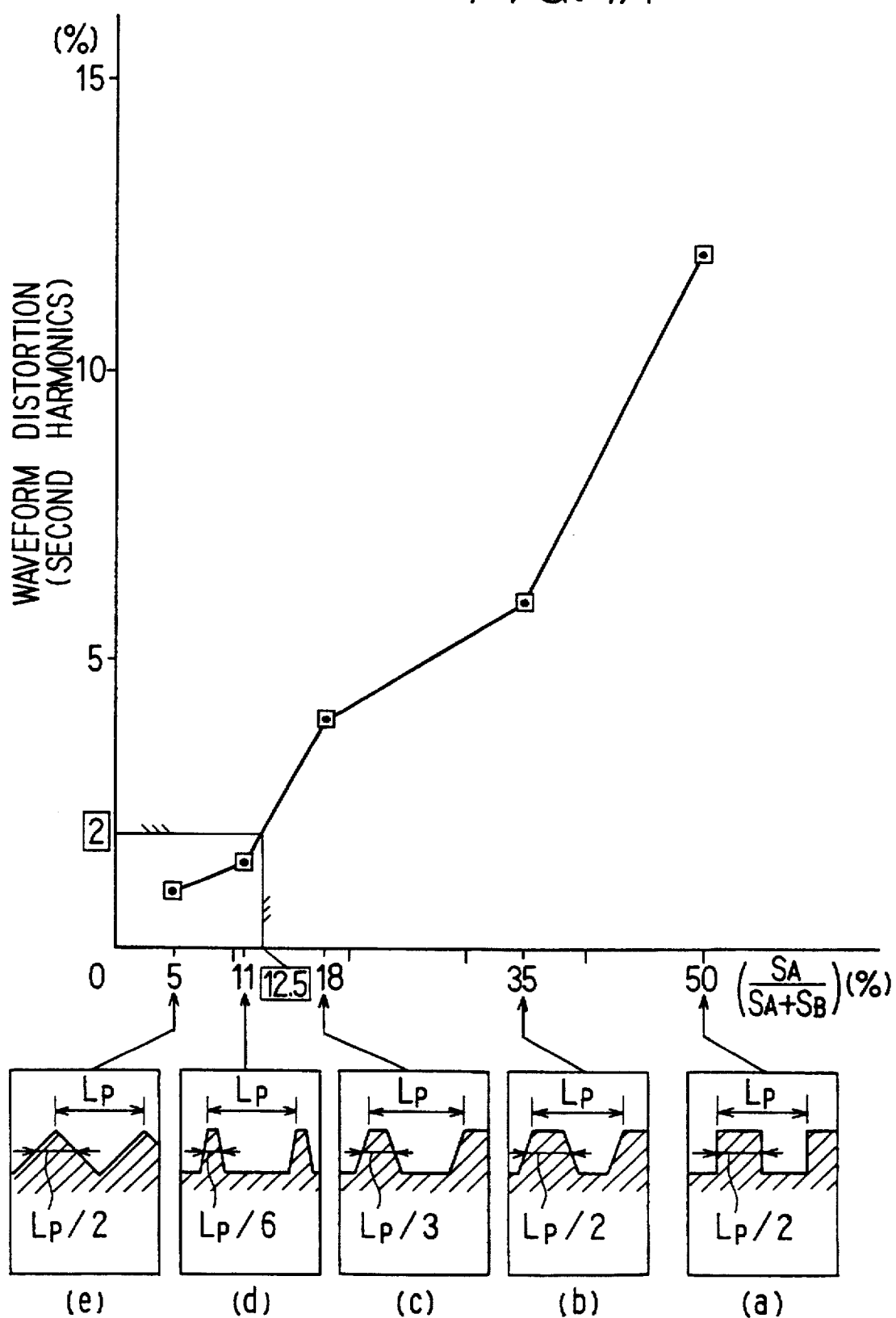
FIG. 9A is a diagram for showing a relationship between the gear tooth shape and an amount of waveform distortion (secondary higher harmonic component), FIG. 9B and FIG. 9C($a$) to FIG. 9C($e$) show such relationships that average tooth widths are changed and a space factor is changed with respect to pitches between the adjacent teeth.

Although the embodiment is directed to the gear tooth shape made of the triangular shape, this gear tooth shape may be modified in many other ways. FIG. 9A is an experimental graph showing a relationship between the gear tooth shape and the waveform distortion rate (secondary higher harmonic component) in conjunction with the space factor of the tip portion of the gear tooth to the tooth.

Figure 9B:
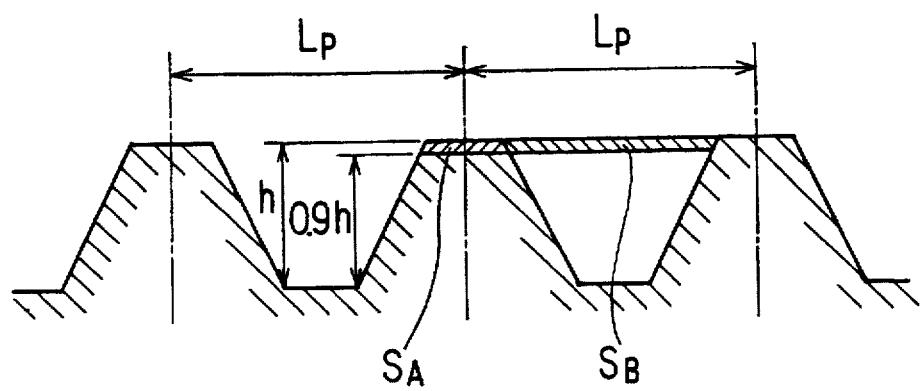

The space factor "SA/(SA+SB)(%)" of the tooth indicated in the abscissa of FIG. 9A denotes such a ratio of SA to (SA+SB), assuming that, as shown in FIG. 9B, a cross-sectional area of a tip portion of tooth occupied from a tip thereto to 10% portion in height is defined as "SA" (namely, cross-sectional area means an area, as viewed from an axial direction, by setting an axis perpendicular to the bias magnetic field direction by the gear moving direction), and another cross-sectional area of a portion within a tooth notch portion, corresponding to the tip portion, is defined by SB.

On the other hand, the waveform distortion amount (%) of the ordinate in FIG. 9A indicates the magnitude of the secondary higher harmonic component. It should be noted that values of Lp/2, Lp/3, Lp/6 in (a) to (e) of FIG. 9A indicate averaged tooth widths of these teeth, and the averaged tooth width means an average value between the tooth width W1 of the tip portion and the tooth width W2 of the root portion.

Figure 9C:
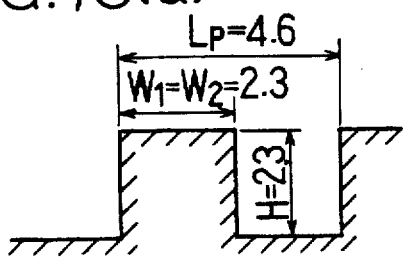
Figure 9C:
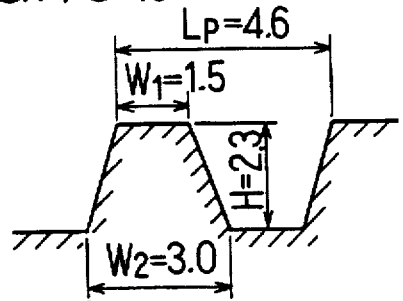
Figure 9C:
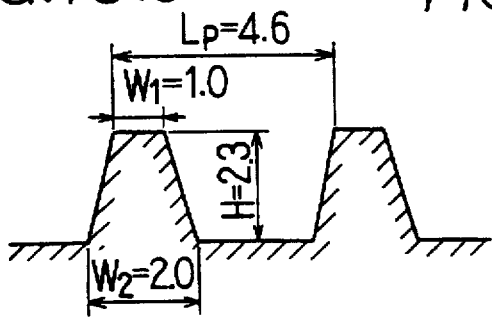
Figure 9C:
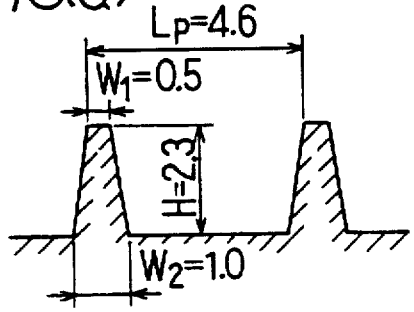
Figure 9C:
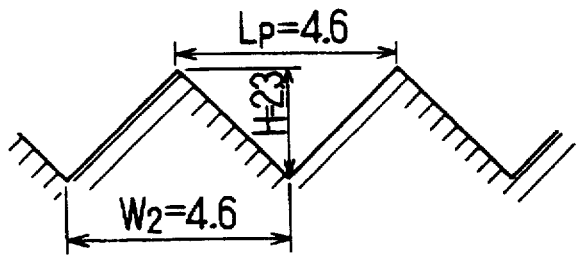

Now, symbols (a) to (e) shown in FIG. 9A represent that while the pitch Lp between the adjacent teeth is maintained at a constant value, the tooth shape is varied. More specifically, example (a) shows a pitch to (:) an averaged tooth width in rectangular tooth=2:1 [space factor is 50%]. Example (b) shows a pitch: an averaged tooth width in trapezoidal tooth=2:1 [space factor is 35%]. Example (c) shows a pitch: an averaged tooth width in trapezoidal tooth=3:1 [space factor is 18%]. Example (d) shows a pitch: an average width in trapezoidal tooth=6:1 [space factor is 11%]. Example (e) shows a pitch: an averaged tooth width in triangular tooth=2:1 [space factor is 5%]. In FIG. 9C(a) to FIG. 9C(e), there are represented detailed dimensions of the respective teeth in the examples (a) to (e) in FIG. 9A. Symbol "W1" indicates a tooth width of a tip portion, and symbol "W2" represents a tooth width of a root portion.

In FIG. 9A, the tooth shapes shown in the examples (a) to (c) may cause the MRE output signals to be distorted, because the secondary higher harmonic component is increased. To the contrary, the tooth shapes shown in the examples (d) and (e) can apparently suppress the distortion produced in the MRE output signal, because the secondary higher harmonic component is reduced. It should be noted that the example (e) is the same as the above-described triangular teeth. Further, it could be recognized that when the tooth width is made narrower than that of the example (d), the secondary higher harmonic component can be further reduced. However, when the averaged width of the gear tooth is made smaller than ⅙, i.e., the pitch between the adjacent teeth, rigidity (stiffness) of the gear is reduced, so that machining of this gear would become difficult. Another confirmation could be made that when the space ratio indicated in the example (d) is employed, even if the gear tooth is made of rectangular shape, the secondary higher harmonic component can be sufficiently reduced.

In other words, as apparent from the graph in FIG. 9A, when the averaged width of the gear is made to ⅙ of the teeth pitch, distortion contained in the MRE output signal can be eliminated and fluctuations in the intervals of the pulse signal can be reduced.

The waveform distortion amount or rate is smaller than, or equal to 2%, but it is convenient to be practically used as the magnetic rotation detecting apparatus. This is because when the waveform distortion amount, namely the secondary higher harmonic component, is large, if the MREs are actually mounted opposite to the gear teeth, then the intervals between the MREs and the gear teeth are fluctuated. As a result, the waveform of the MRE output signal is distorted, and thus the intervals of the pulse signal are shifted. Accordingly, the rotations of the gear teeth cannot be detected in higher accuracy.

Under such a circumstance, as apparent from FIG. 9A, such a tooth shape is preferable where the value of space factor SA/(SA+SB) satisfies the following condition: SA/(SA+SB)<12.5%. It should be noted that according to the present invention, the tooth shape may be made as the rectangular tooth and the triangular tooth, as shown in (d) and (e). It may be an ellipyical tooth shape. Also, another tooth shape only whose tip portion is made sharp may be employed, and a further tooth shape whose central portion has a concave may be employed.

On the other hands, when the waveform distortion amount becomes smaller, if the intervals between the MREs and the gear teeth are fluctuated, then fluctuation in the pulse intervals becomes small. This reason is given as follows.

That is, in such a case of this embodiment that the secondary higher harmonic component is reduced and the waveform of the MRE output signal is made symmetrical along the right and left directions, when the intervals (referred to as "gaps" hereinafter) between the gear tooth and the MRE become smaller than a predetermined value (namely, large gap), waveform distortion and the pulse signal intervals when the waveforms are distorted are illustrated in FIG. 15A to FIG. 17E.

Figure 16A:
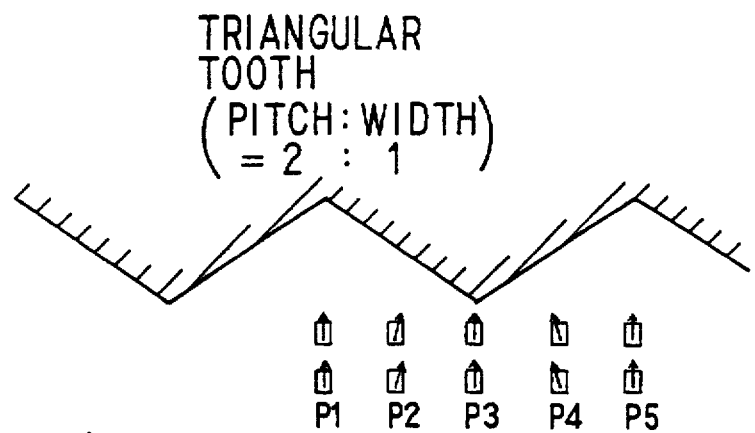
FIGS. 16A to 16E are timing charts for explaining changes in pulse intervals when a gap is changed in the embodiment of the present invention.
Figure 16B:
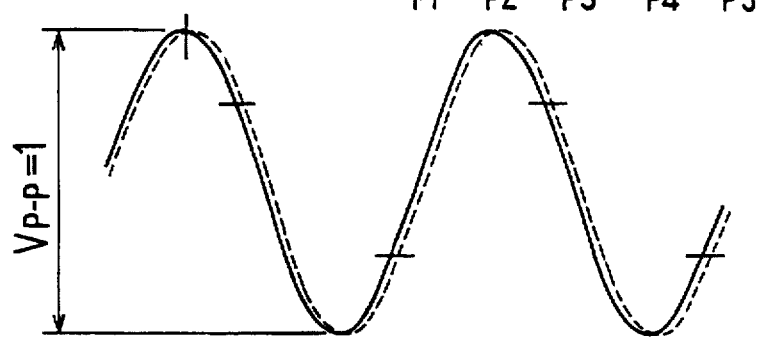
Figure 16C:
Figure 16D:
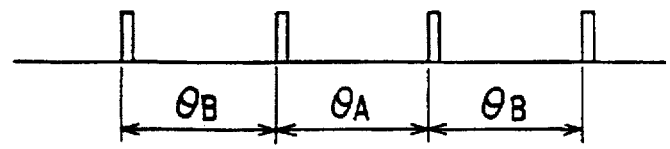
Figure 16E:
Figure 17A:
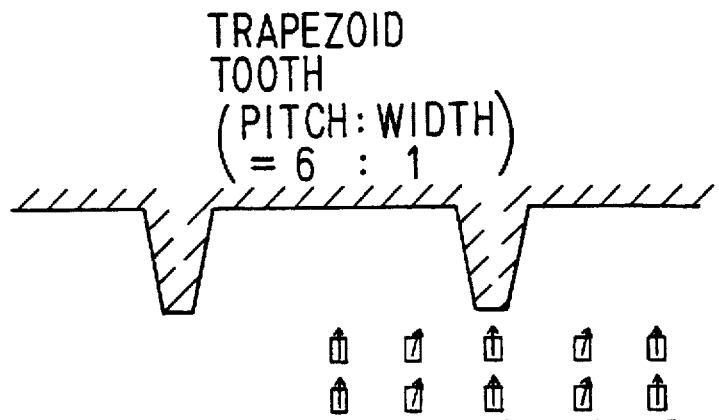
FIGS. 17A to 17E are timing charts for explaining changes in pulse intervals when a gap is changed in the another embodiment of the present invention.
Figure 17B:
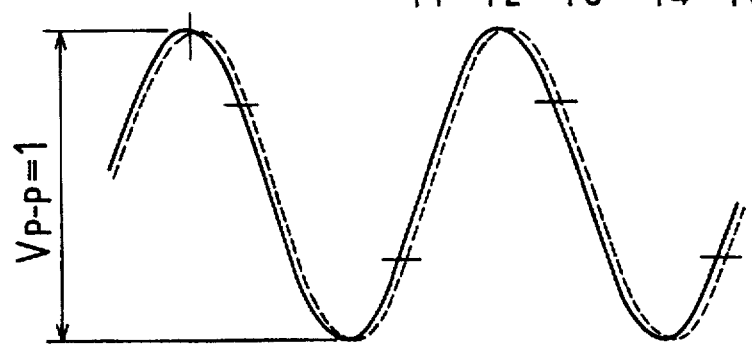
Figure 17C:
Figure 17D:
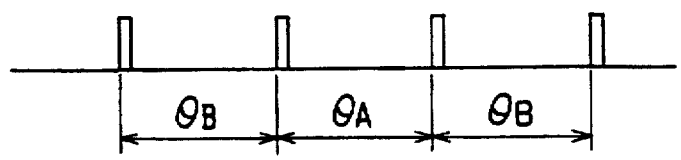
Figure 17E:
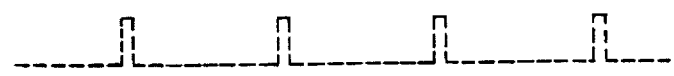

In FIGS. 15B, 16B and 17B, the waveforms whose gaps are preselected values are indicated by a solid line, whereas the waveforms whose gaps become small are indicated by a dotted line.

FIGS. 15A to 15E correspond to the tooth shape of example (a), FIGS. 16A to 16E correspond to the tooth shape of example (e), and FIGS. 17A to 17E correspond to the tooth shape of example (d).

When the gap becomes small in the rectangular tooth shown in FIGS. 15A to 15E, the positions P1, P3 and P5 are not changed, but the maximum or peak level position P2 and the minimum or bottom level position P4 of the deflection angle of the magnetic vector B are approached to the center position of the tooth width. As a consequence, the waveform is shifted along the direction close to the center position P3 of the tooth width. A comparison is made of a signal shift amount between the rising signal and the falling signal, which are produced respectively based upon the threshold value VTH(+) close to the center position P3 of the tooth width and the threshold value VTH(−) apart from this center position P3. As a result of this comparison, the latter is larger than the former. As a consequence, it becomes θB<θA, and the pulse interval is fluctuated. To the contrary, in the triangular tooth shown in FIGS. 16A to 16E, and the rectangular tooth shown in FIGS. 17A to 17E having the pitch:tooth width=6:1, even when the gap becomes small, the waveforms are not distorted. As a consequence, there is no shift in the rising signal and falling signal of the binary signal. Therefore, under θB=θ, the pulse interval is not fluctuated. It should be noted that when the gap becomes small, the amplitude of the actual waveform becomes large. In connection thereto, the threshold values VTH(+) and VTH(−) are different from each other. However, in this case, for the sake of simplicity, the waveforms having the same amplitudes and the same threshold values are represented.

In order that the first threshold value VTH1 and the second threshold value VTH2 with respect to the rectangular tooth shown in the example (a) should be set to θB=θA at the center values, the differences from the peak value and the bottom value are not made constant.

Figure 18:
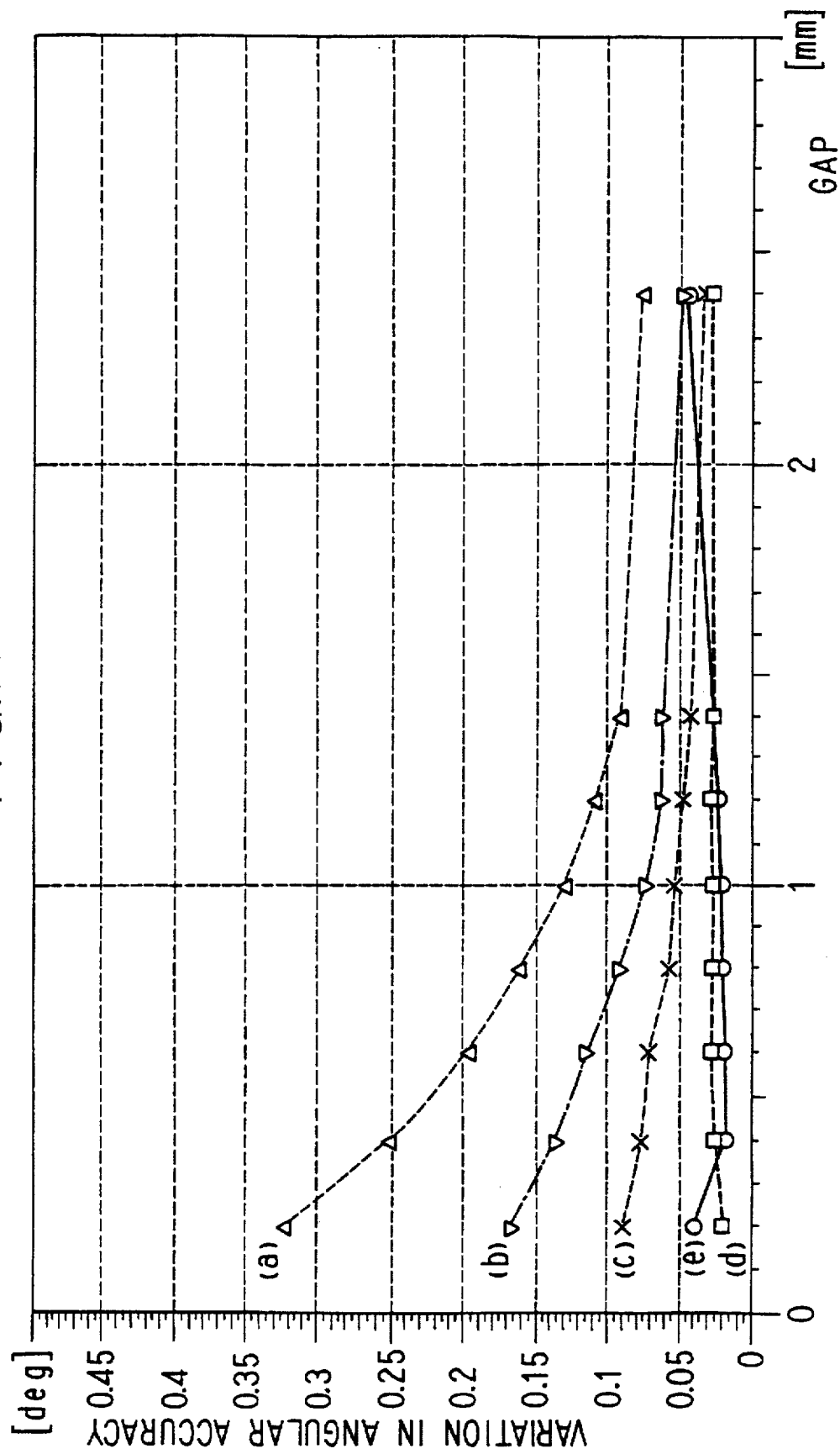
FIG. 18 is a graph for showing fluctuations in angular accuracy with respect to gaps.

FIG. 18 is an experimental graphic representation for showing fluctuations or variations in accuracy of rotation angle detection with respect to fluctuations in gaps while the respective tooth shapes of examples (a) to (e) are used as parameters.

In this graphic representation, ¼ of a difference between the peak value Vp of the MRE output signal and the bottom value VB, namely (Vp−VB)/4 is subtracted from the peak value Vp to obtain the first threshold value VTH1, and this difference is added to the bottom value VB to obtain the second threshold value VTH2.

That is, $$VTH1 = Vp - (Vp - VB)/4$$
$$= 3Vp/4 - VB/4$$
$$VTH2 = VB + (Vp - VB)/4$$
$$= Vp/4 + 3VB/4$$

As apparent from FIG. 18, as to the rectangular tooth of the example (a), when the gap is increased, the angle detection accuracy is high and fluctuation is made. As to the triangular tooth of example (e) and the trapezoidal tooth of example (d) having the pitch:tooth width=6:1, fluctuation in the angle precision is small. Since the gap is fluctuated within a range between 0 and 1.6 mm, fluctuation in the angle detection accuracy of the examples (d) and (e) containing small waveform distortion amounts becomes small, as compared with that of the other shapes of examples (a), (b) and (c). Therefore, as apparent from FIG. 18, the rotation angles can be detected with higher precision.

Then, a fuel injection amount may be controlled with higher precision by applying this structure to a rotation angle detecting apparatus of either a diesel engine, or a direct injection type internal combustion engine.

Alternatively, the present invention may be embodied by employing the following alternative modes other than those of the above-explained embodiment.

Figure 10:
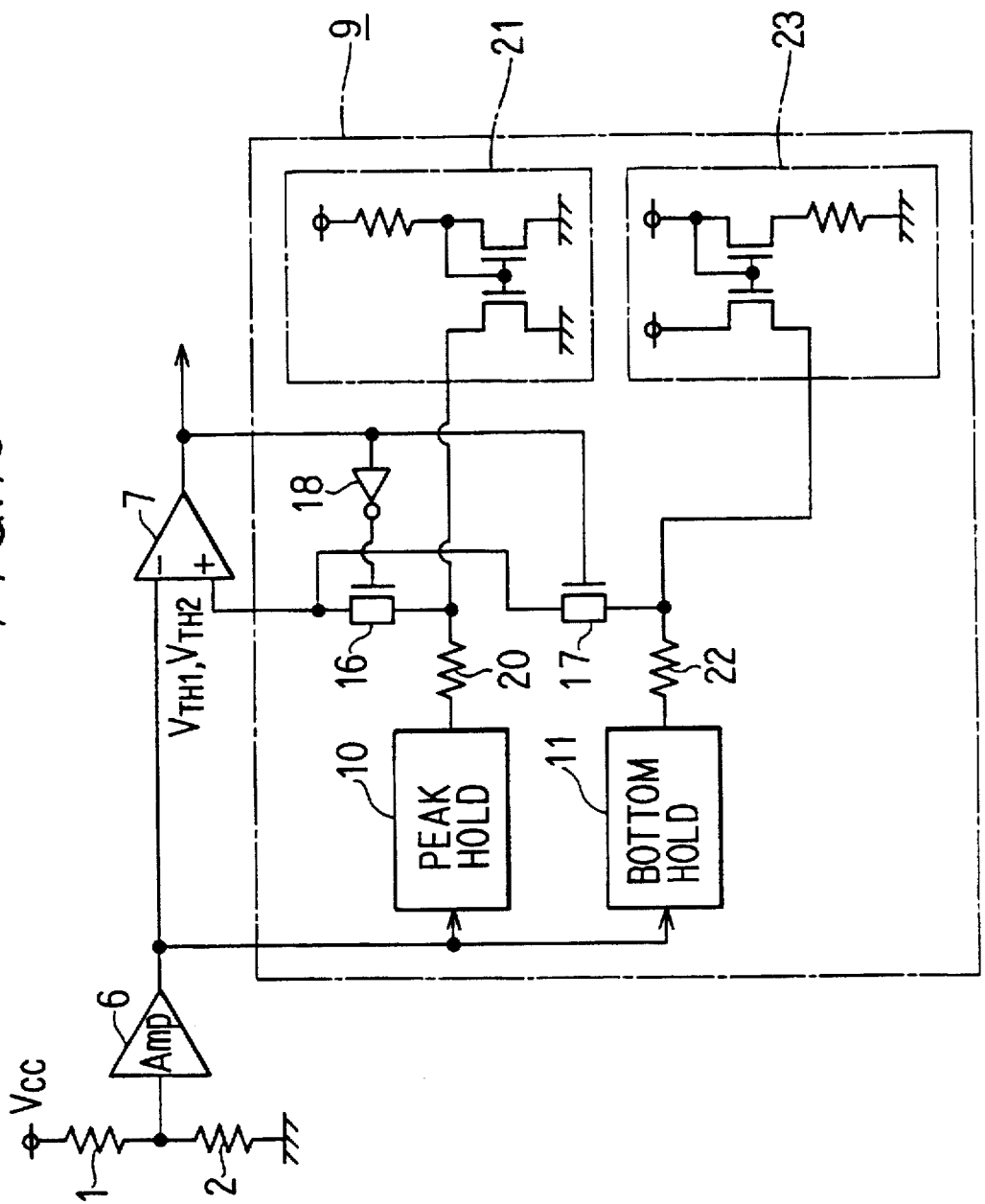
FIG. 10 is a circuit diagram for showing a threshold value setting circuit according to another embodiment of the present invention.
Figure 11:
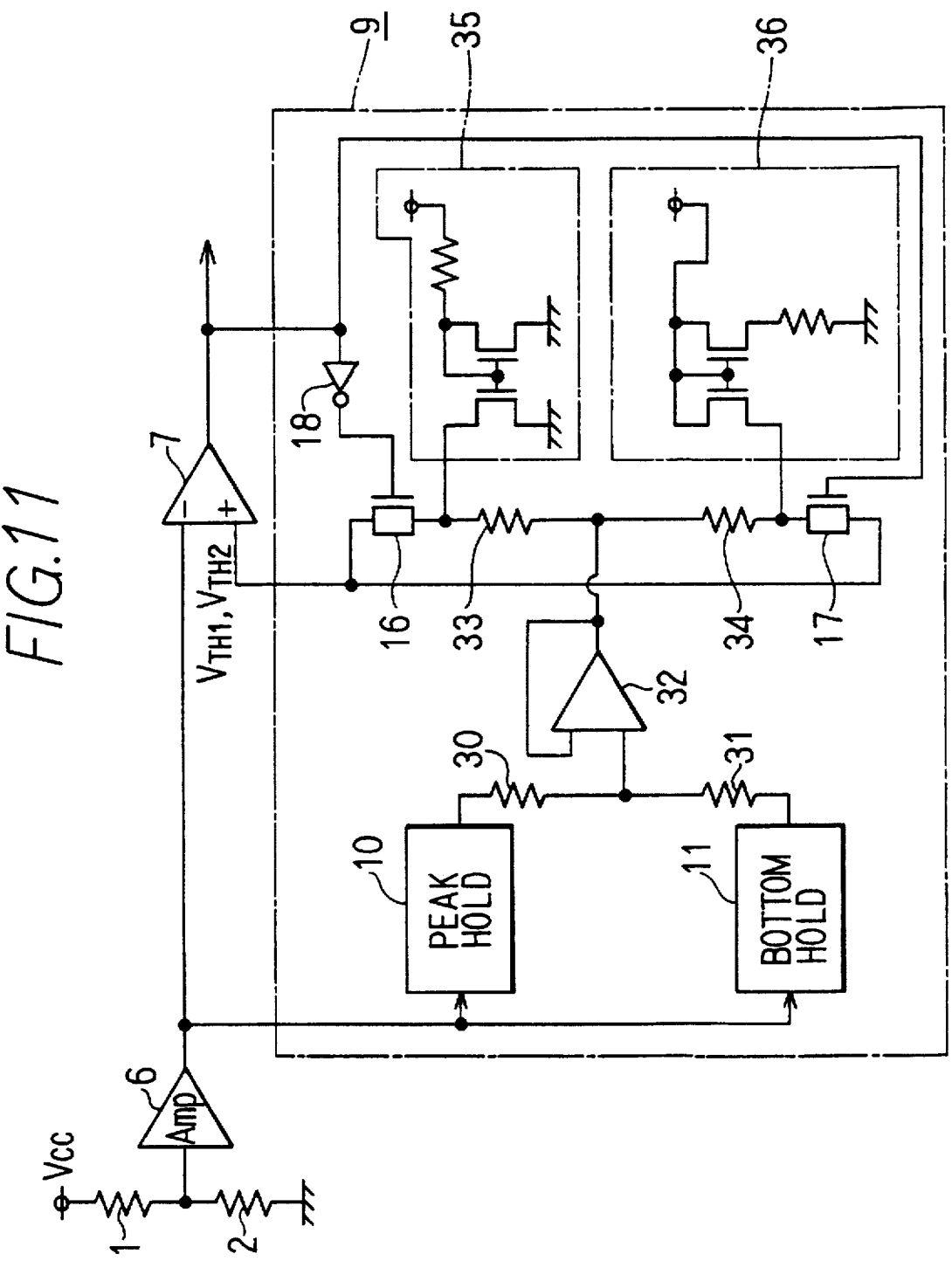
FIG. 11 is a circuit diagram for showing another threshold value setting circuit according to a further embodiment of the present invention.

(1) The threshold value setting circuit 9 may be arranged in such circuit arrangements as shown in, for example, FIG. 10 and FIG. 11, and threshold values of this threshold value setting circuit 9 may be set to different values from those of the above-described embodiment. That is, in the threshold value setting circuit 9 shown in FIG. 10, a constant current circuit 21 is connected via a resistor 20 to the peak hold circuit 10. Another constant current circuit 23 is connected via a resistor 22 to the bottom hold circuit 11. According to this circuit, when the digital switch 16 becomes conductive, a value produced by subtracting a preselected voltage value V0 from the peak value VP of the MRE output signal is set as the first threshold value VTH1 (VTH1=VP−V0). When the digital switch 17 becomes conductive, a value obtained by adding a predetermined voltage value V0 to the bottom value VB of the MRE output signal is set as the second threshold value VTH2 (VTH2=VB+V0).

On the other hand, in the threshold value setting circuit 9 shown in FIG. 11, a central voltage is detected from the peak voltage of the peak hold circuit 10 and the bottom voltage of the bottom hold circuit 11 by way of the resistors 30 and 31. Then, this central voltage is applied via an amplifier 32 to a midpoint between the resistors 33 and 34. A constant current circuit 35 is connected between one resistor 33 and the digital switch 16, whereas another constant current circuit 36 is connected between the other resistor 34 and the digital switch 17. According to this circuit, when the digital switch 16 is conducted, a value obtained by adding a preselected voltage value V1 to the central voltage of the MRE output signal is set as the first threshold value VTH1 (VTH1=(VP+VB)/2+V1). When the digital switch 17 is conducted, a value obtained by subtracting a predetermined value V1 from the central voltage of the MRE output signal is set as the second threshold value VTH2 (VTH2=(VP+VB)/2−V1).

(2) An "R (rounded portion)" may be formed in the tip portion of the triangular tooth. For instance, in the case of FIG. 2, the "R" having dimensions smaller than 0.4 to 0.6 mm is allowable to be formed.

(3) Although the present invention has been embodied in the rotary movement type magnetic detecting apparatus, the present invention may be alternatively embodied in a linear movement type magnetic detecting apparatus.

In accordance with the present invention, there are various advantages. That is, distortion contained in the signal waveforms derived from the magnetoresistance element, which is caused when the object under detection passes through the teeth of the gear, can be obviated. Moreover, fluctuations in the intervals of the pulse signal obtained by performing the waveform shaping operation can be reduced, even when the intervals between the gear teeth and the sensor are fluctuated.

What is claimed is:

1. A magnetism detecting apparatus comprising:
a movable object under detection having a plurality of teeth made of a magnetic material and a plurality of notches formed between said teeth;
a bias magnet having a magnetizing surface disposed adjacent to the teeth of said object for producing a biasing magnetic field toward said object;
a magnetoresistance element formed by at least one pair of magnetoresistance patterns disposed at approximately +45 degrees and −45 degrees, respectively, with respect to said magnetic field and arranged within a plane within said biasing magnetic field direction and a direction along which said teeth are aligned, magnetic vectors from said one pair of magnetoresistance patterns being parallel to one another, said magnetoresistance element being separated from said object by a predetermined distance, said magnetoresistance element producing a resistance change in response to a state change in the biasing magnetic field exerted upon said object by said bias magnet resulting from movement of said object within said magnetic field; and waveform shaping means for digitizing an output waveform of said magnetoresistance element based upon high and low threshold values, and for producing a pulse signal corresponding to a rising edge of the digitized output waveform and a falling edge of the digitized output waveform, wherein each of said teeth satisfies SA/(SA+SB)<0.125, where SA denotes a cross-sectional area of a tip portion of each of said teeth, which tip portion has a height of 10% of a total height of each of said teeth as measured from a tip of each of said teeth, and SB denotes a cross-sectional area of a notch portion of each of said notches, which notch portion has a height corresponding to the height of said tip portion as measured from an outer extremity of said notches aligned with the tip of said teeth.

2. A magnetism detecting apparatus as claimed in claim 1, wherein:

each of said teeth formed in said object is shaped as an isosceles triangle in its cross section.

3. A magnetism detecting apparatus as claimed in claim 2, wherein:

said isosceles triangle has a vertex angle of 90 degrees at said tip portion thereof.

4. A magnetism detecting apparatus as claimed in claim 1, wherein:

each of said teeth of said object has its cross section shaped as a trapezoid having an averaged tooth width that is about ⅙ of a pitch between said teeth.

5. A magnetic detecting apparatus as claimed in claim 1, wherein:

said object is a rotatable gear having said teeth on an outer periphery thereof.

6. A magnetism detecting apparatus comprising:

a rotatable gear having a plurality of teeth made of a magnetic material and a plurality of notches formed between said teeth;

a bias magnet having a magnetizing surface disposed adjacent to the teeth of said gear, said bias magnet producing a biasing magnetic field toward said gear;

a magnetoresistance element formed by at least one pair of magnetoresistance patterns disposed at approximately +45 degrees and −45 degrees, respectively, with respect to said magnetic field and arranged within a plane within said biasing magnetic field direction and a direction along which said teeth are aligned, magnetic vectors from said one pair of magnetoresistance patterns being parallel to one another, said magnetoresistance element separated from said gear by a predetermined distance, said magnetoresistance element producing a resistance change in response to a change of said magnetic vectors based on said biasing magnetic field resulting from movement of said teeth through said biasing magnetic field; and a waveform shaping circuit constructed and arranged to digitize an output waveform of said magnetoresistance element based upon high and low threshold values, said waveform shaping circuit producing a pulse signal corresponding to a rising edge of the digitized output waveform and a falling edge of the digitized output waveform, wherein each of said teeth satisfies SA/(SA+SB)<0.125, where SA denotes a cross-sectional area of a tip portion of each of said teeth, which tip portion has a height of 10% of a total height of each of said teeth as measured from a tip of each of said teeth, and SB denotes a cross-sectional area of a notch portion of each of said notches, which notch portion has a height corresponding to the height of said tip portion as measured from an outer extremity of said notches aligned with the tip of said teeth.

7. A magnetism detecting apparatus as claimed in claim 6, wherein:

each of said teeth formed in said object is shaped as an isosceles triangle in its cross section.

8. A magnetism detecting apparatus as claimed in claim 7, wherein:

said isosceles triangle has a vertex angle of 90 degrees at said tip portion thereof.

9. A magnetism detecting apparatus as claimed in claim 6, wherein:

each of said teeth of said object has its cross section shaped as a trapezoid having an averaged tooth width that is about ⅙ of a pitch between said teeth.

* * * * *